(No Model.)

J. S. GOLDSMITH.

ADVERTISING WAGON.

No. 269,045. Patented Dec. 12, 1882.

Witnesses. Inventor.

UNITED STATES PATENT OFFICE.

JOHN SIDNEY GOLDSMITH, OF NEW YORK, N. Y.

ADVERTISING-WAGON.

SPECIFICATION forming part of Letters Patent No. 269,045, dated December 12, 1882.

Application filed September 2, 1882. (No model.)

*To all whom it may concern:*

Be it known that I, JOHN SIDNEY GOLDSMITH, a citizen of the United States, residing in the city, county, and State of New York, have invented a new and useful Improvement in Advertising Wagons or Vans, of which the following, taken in connection with the accompanying drawings, is a full, clear, and accurate description.

The principal object of my invention is to form a new advertising wagon or van which shall be so arranged that the advertisements can be successively seen by a person standing in the same place or from one standpoint; and it consists essentially in providing a wagon or other vehicle with one or more frames, which are so arranged as to revolve, and thus expose in turn the advertisements placed on them to the view of the persons passing by.

Another object of my invention is to provide suitable apparatus so arranged as to cause the advertising frame or frames to revolve with the motion of the wheels of the wagon or vehicle. The revolution of such frame or frames changes the position of the advertising matter.

Figure 1:
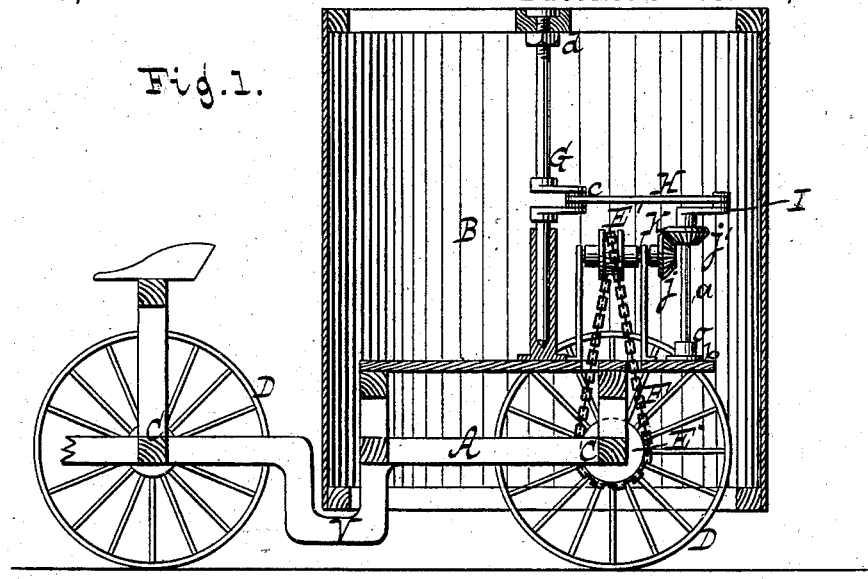
Figure 2:
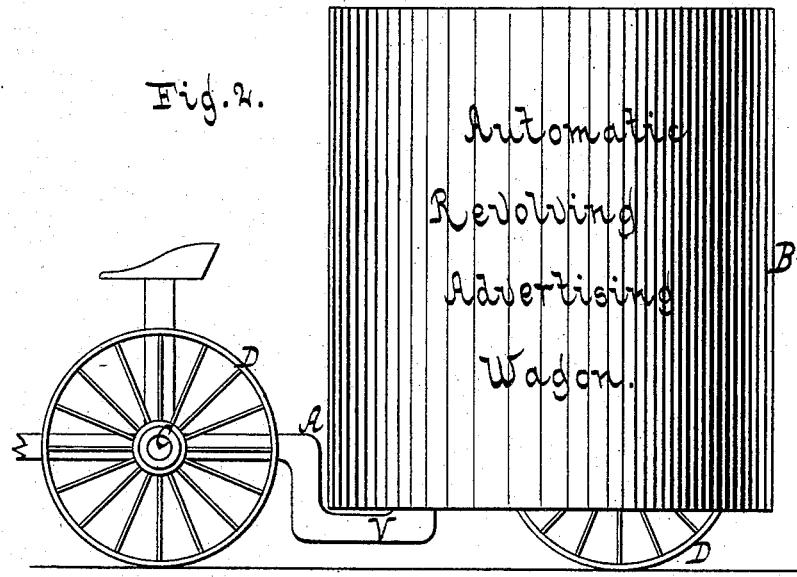

In the drawings, Figure 1 represents a vertical longitudinal section of my improvement. Fig. 2 shows a side elevation of the same.

My improvement is made as follows:

A represents a wagon or other vehicle so arranged as to sustain one or more frames, B, preferably of circular shape, on which the desired advertisements are placed. The frames may be revolved by hand-power or other suitable apparatus placed inside of them, the frame or frames being provided, if desired, with a door or doors for admitting persons to work them.

D represents the wheels of the vehicle, and C the axles. To the hub of one or more of the wheels D is attached a grooved wheel, E, which revolves with the motion of the wheel or wheels D, and imparts its motion to an endless chain, F. This chain F passes up and around another grooved wheel, E', which is secured at one end to the body of the vehicle and imparts motion to such grooved wheel E'. The bar or shaft K is attached at one end to a beveled-gear wheel, J, and secured at its other end to the grooved wheel E'. This beveled-gear wheel J engages with another gear-wheel, J', which is secured to a standard, a, attached to the body of the vehicle at b. The motion of the gear-wheel J' is communicated by the bar I to the bar H. This bar H is secured at c to the crank or vertical bar G, and thus moves said crank or bar G. The crank or vertical bar G is secured to the frame B at d, and thus causes the frame B to revolve with the movement of the vehicle. If two or more frames are used, suitable connections may be made with them from the first frame, or they may be connected with the wheels of the vehicle direct by like apparatus as described. To the axles C of the vehicle the reach L is secured, provided with the crook V, thus allowing the frame or frames to set down near the ground.

Having thus described my invention, what I claim, and desire to secure by Letters Patent, is—

In an advertising-vehicle, the combination of a revolving frame, formed with an open end to pass down over the vehicle-frame and rear wheels, as described, with front wheels connected to rear wheels by a reach curved to pass round the end of the cylinder, and mechanism for revolving the cylinder, substantially as shown and specified.

In testimony whereof I have hereunto set my hand this 1st day of September, 1882.

JOHN SIDNEY GOLDSMITH.

In presence of—
CHARLES G. COE,
H. H. SMITH.